United States Patent [19]

Levinson

[11] Patent Number: 4,580,873

[45] Date of Patent: Apr. 8, 1986

[54] OPTICAL MATRIX SWITCH

[75] Inventor: Frank H. Levinson, Hanover Township, Morris County, N.J.

[73] Assignee: AT&T Bell Laboratories, Murray Hill, N.J.

[21] Appl. No.: 567,369

[22] Filed: Dec. 30, 1983

[51] Int. Cl.[4] .............................................. G02B 6/26
[52] U.S. Cl. ............................ 350/96.20; 350/96.13; 350/96.15
[58] Field of Search .............. 350/96.13, 96.15, 96.18, 350/96.20, 96.16; 250/227

[56] References Cited

U.S. PATENT DOCUMENTS

| | | | |
|---|---|---|---|
| 4,153,329 | 5/1979 | Gillette | 350/96.13 |
| 4,521,069 | 6/1985 | Ikeda | 350/96.13 |

FOREIGN PATENT DOCUMENTS

| | | | |
|---|---|---|---|
| 54-161951 | 12/1979 | Japan | 350/96.20 |
| 54-161952 | 12/1979 | Japan | 350/96.20 |
| 56-150707 | 11/1981 | Japan | 350/96.20 |
| 54-139704 | 8/1982 | Japan | 350/96.18 |

OTHER PUBLICATIONS

R. T. Gallagher, "Microshutters Flip to Form Characters in Dot-Matrix Display", *Electronics,* vol. 56, pp. 81-82 (Jul. 14, 1983).

*Primary Examiner*—John Lee
*Attorney, Agent, or Firm*—Lester H. Birnbaum

[57] ABSTRACT

An m×n optical switch is formed on a semiconductor substrate. Grooves are etched at the edges of the substrate to accommodate input and output optical fibers so that the output fibers are placed orthogonal to the light paths of the input fibers. An array of photodetectors is provided at an edge opposite to that of the input fibers to receive the input signals. At each crosspoint defined by the input and output fibers is an electromechanically actuated mirror which in one state permits passage of light from its associated input fiber, and in another state deflects the light to its associated output fiber.

9 Claims, 3 Drawing Figures

OPTICAL MATRIX SWITCH

BACKGROUND OF THE INVENTION

This invention relates to optical switches, and in particular to an m×n matrix switch.

With the successful introduction of lightwave technology in the field of telecommunications, increasing attention is being focused toward complete data networks utilizing optical fibers. As these networks have become more complex, a need has arisen for a matrix switching system which is capable of optically coupling any one of a large number of fibers to any one of a large number of other fibers. The switch should be compact and economical. Further, for efficiency in operation, the switch should be "nonblocking", i.e., the switching of one input fiber to an output fiber should not interfere with the light transmission of any other input fiber to any other output fiber.

It is therefore an object of the invention to provide an optical matrix switch which can accommodate transmission between a significant number of optical fibers.

SUMMARY OF THE INVENTION

This and other objects are achieved in accordance with the invention which is an optical switch including a semiconductor substrate comprising a major surface. The switch further includes a first linear array of optical fibers providing input signals and a second linear array of optical fibers for receiving the signals from the first array. The second array is situated orthogonal to the first array. A two-dimensional array of movably mounted reflecting elements are formed on the semiconductor surface and aligned with the arrays of fibers so that in a first position, each element will allow the passage of light from an associated input fiber and in a second position, each element will deflect light from an associated input fiber to an associated output fiber.

BRIEF DESCRIPTION OF THE DRAWING

These and other features of the invention are delineated in detail in the following description. In the drawing.

It will be appreciated that for purposes of illustration, these Figures are not necessarily drawn to scale.

DETAILED DESCRIPTION

The basic principles of the invention will be described in accordance with the embodiment illustrated in FIGS. 1-3.

Figure 1:
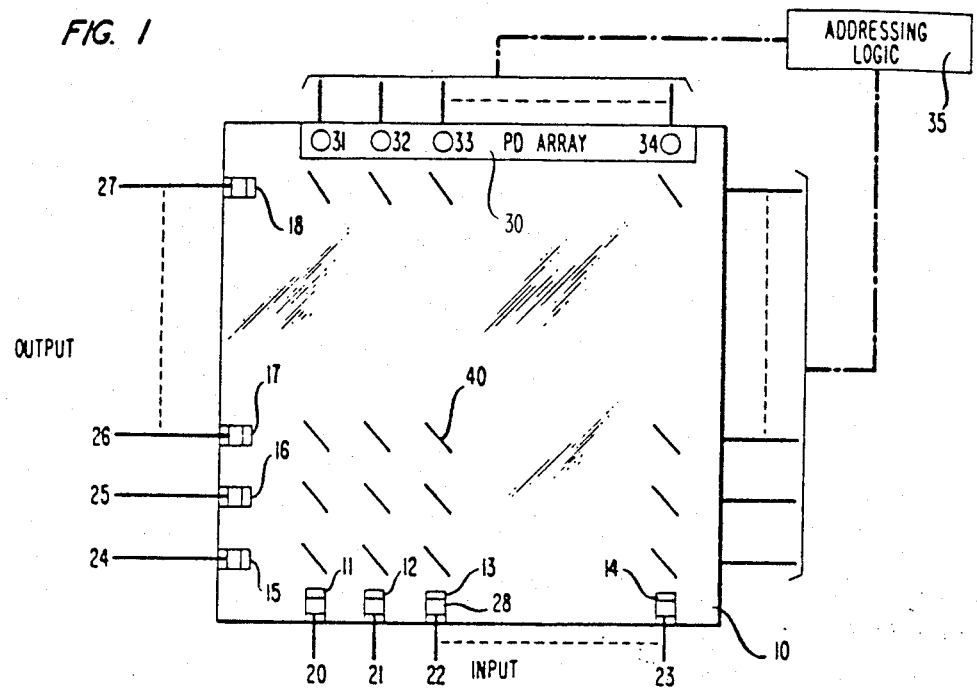
FIG. 1 is a top schematic view of a switch in accordance with one embodiment of the invention.

FIG. 1 illustrates schematically the basic components of the switch. A semiconductor substrate, 10, in this example silicon, includes in one major surface at two adjacent edges, a first and second set of grooves. Grooves in the first set are shown as 11-14 and those of the second set as 15-18. It will be appreciated that not all the grooves are illustrated for purposes of clarity in the Figure. Each groove is etched, in accordance with known techniques, so that an optical fiber may be mounted and aligned therein. The first set of grooves, 11-14, receives optical fibers, 20-23, respectively, and the second set of grooves, 15-18, receives fibers, 24-27, respectively. In this particular example, the grooves are formed to align graded-index-of-refraction lenses, such as 28, attached to the ends of the fibers in order to collimate the light to and from the fibers. Alternatively, the grooves may be formed to align only fibers without lenses.

Fibers 20-23, in this example each carry an input signal, and fibers 24-27 are adapted to receive the input signals under certain conditions to provide the switched output. At the edge of the substrate opposite to the input fibers, 20-23, is an array of photodetectors illustrated schematically as region 30. The array comprises a linear array of standard photodetectors, four of which are illustrated schematically as circles, 31-34. Each photodetector is aligned with one of the input fibers to receive a signal therefrom. The photodetectors could be integrated into the semiconductor by known techniques or could be discrete elements aligned in grooves in the semiconductor. Each photodetector is electrically coupled to some addressing logic circuitry, illustrated as 35, which electrically addresses the elements of the switch. (For the sake of clarity, this latter connection is shown schematically by four wires to the substrate. As will become clearer, two addressing leads will usually be provided to each crosspoint of the switching array.)

Fabricated on the semiconductor substrate is a two-dimensional array of reflecting elements, some of which are illustrated schematically as lines such as 40, oriented at 45° to the input and output fibers. The columns of reflecting elements are aligned with the input fibers and the rows aligned with the output fibers so that each element (e.g., 40) is capable of reflecting a light beam from an associated input fiber (22) to an associated output fiber (26).

Figure 2:
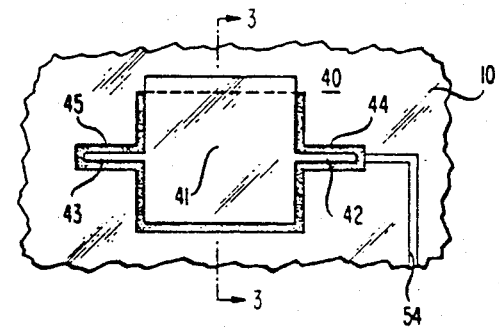
FIGS. 2 and 3 are enlarged views of a portion of the switch in accordance with the embodiment at FIG. 1.
Figure 3:
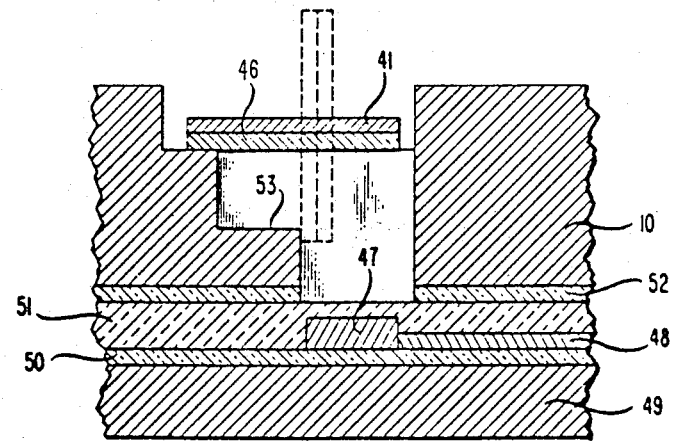

FIG. 2 shows a top view of a portion of the semiconductor substrate including the reflecting element, 40, and FIG. 3 is a cross-sectional view along line 3—3 of FIG. 2. It will be noted that each reflecting element comprises a thin membrane, 41, which can be silicon, including pin members, 42 and 43, which can be formed from the same silicon, extending from two sides. The pin members are placed in grooves, 44 and 45, and the portion of the silicon substrate, 10, which is under the membrane is etched so that the member is free to rotate about the pins (see FIG. 3). The pins are formed slightly off the center axis of the membrane so that its center of gravity will keep it in the down position shown in FIGS. 2 and 3 unless otherwise activated. The membrane also slightly overlaps the etched hole to provide a horizontal stop for the element.

Formed on one surface of the member, 41, is a conducting and reflective layer, 46, which in this example is gold deposited on the underside of the element. The reflecting layer, 46, could also be formed on the top side of member, 41 which another conducting layer formed on the underside. The layer, 46, makes electrical contact through the pin portion, 42, to conductor, 54, which provides a signal from the addressing circuit. The connection is possible since the conductor, 54, extends into the bottom of the groove, 44, and makes contact with the portion of layer, 46, on the pin member.

As shown in FIG. 3, the etched portion of the silicon under membrane, 41, includes a ledge portion, 53, to provide a vertical stop for the element. A portion of the silicon adjacent thereto is completely etched through. Below the area etched out of the substrate is a conductive pad, 47, which again can be gold. This pad may be formed on an oxide layer, 50, over a supporting substrate, 49, which can also be silicon. The substrates 10 and 49 may be glued together by an insulating adhesive layer, 51. A layer of oxide, 52, may also be formed under substrate, 10, to insure further electrical isolation. The pad, 47, may be electrically connected to the addressing circuitry by conductor, 48.

The substrates 10 and 49 can be typically 4×4 inches and the reflecting elements would usually be approximately 2 mm×3 mm×5 mils thick. The fibers usually measure approximately 5 mils in diameter and the lenses, 28, would be approximately 1.8 mm in diameter. A typical substrate could therefore accommodate an array of at least 40×40 fibers. Larger substrates could accommodate arrays of 100×100 fibers or more. Arrays of at least 4×4 fibers could also benefit from the present structure.

In operation, the reflecting elements (e.g., 40) are initially in their horizontal positions so that light from the input fibers (e.g., 22) passes undisturbed to their associated photodiodes (33) where the incoming signals are electrically monitored. If a data signal is received to switch one of the input fibers (22) to one of the output fibers (26), the addressing circuitry applies a voltage to the leads (54 and 48) coupled to the reflecting element (40) at the desired cross point. The voltage charges the pads (46 and 47) to opposite polarities to provide attraction therebetween. This causes the element (40) to rotate about the pins into a vertical position, illustrated in phantom in FIG. 3. The reflecting surface (46) therefore appears in the path of at least a major portion of the light beam from the input fiber (22) and at a 45 degree angle to the beam so that the beam is deflected to the orthogonal fiber (26).

When it is desired to return the switch to its resting position, the same polarity can be applied to the pads (46 and 47) to repel the member (40) to its horizontal position. The signal for returning the element to its "off" state can be supplied by the input fiber if a portion of the beam is permitted to pass through to its associated photodiode even when the element is in its "on" (vertical) state (e.g., the mirror could deflect only a portion of the area of the beam or the reflecting layer could be only partially reflecting). Of course, other means of actuating the reflecting elements can be provided.

It will be appreciated that any input fiber can be switched to any output fiber by addressing the appropriate reflecting element. In addition, the switching of an input fiber to an output fiber will not interfere with the path of any beam from any other input fiber to any other output fiber and so the switch is nonblocking.

It will also be appreciated that, since a semiconductor substrate, 10, is utilized to make the switch, the necessary addressing circuitry, 35, can be integrated into the switch.

Various modifications will become apparent to those skilled in the art. All such variations which basically rely on the teachings through which the invention has advanced the art are properly considered within the spirit and scope of the invention.

What is claimed is:
1. An optical switch comprising:
a semiconductor substrate comprising a major surface;
a first linear array of optical fibers providing input signals and a second linear array of optical fibers for receiving the signals from the first array, the second array being situated essentially orthogonal to the first array;
a two-dimensional array of rotatably mounted reflecting elements formed on the semiconductor surface, each reflecting element comprising a membrane with at least one reflecting surface, which array is aligned with the arrays of fibers so that in a horizontal position each element will allow the passage of light from an associated input fiber and in a vertical position will deflect light from an associated input fiber to an associated output fiber.

2. The device according to claim 1 wherein the substrate further comprises grooves formed at two adjacent edges of the substrate for receiving said fibers.

3. The device according to claim 1 wherein the device further includes a linear array of photodetectors opposite said input fibers so that each photodetector receives light from an associated input fiber at least when the light is undeflected by one of the reflecting elements.

4. The device according to claim 1 wherein the membrane is caused to rotate by the application of a voltage between the membrane and a conductive pad associated with that membrane.

5. The device according to claim 1 wherein the arrays of fibers comprise at least 100 input fibers and 100 output fibers.

6. The device according to claim 1 wherein each reflecting element includes pin members extending from two sides thereof which are mounted in grooves in the semiconductor substrate, and the portion of the substrate under each membrane is etched so that the reflecting element, is free to rotate about the pin members.

7. The device according to claim 6 wherein the pin members are formed off the center axis of the element so that the center of gravity of the element will keep it at rest in a horizontal position.

8. The device according to claim 6 wherein the etched portion of the substrate under each reflecting element includes a ledge portion to provide a vertical stop for the reflecting element.

9. The device according to claim 1 wherein the membrane comprises silicon.

* * * * *